United States Patent
Yang

(10) Patent No.: US 9,127,477 B1
(45) Date of Patent: Sep. 8, 2015

(54) LATCH

(71) Applicants: Wagon Key Group LLC, Warsaw, IN (US); ESSC Group, Inc., Wooster, OH (US)

(72) Inventor: Mary Yang, Wooster, OH (US)

(73) Assignees: ESSC Group, Inc., Wooster, OH (US); Wagon Key Group, LLC, Warsaw, IN (US)

(*) Notice: Subject to any disclaimer, the term of this patent is extended or adjusted under 35 U.S.C. 154(b) by 0 days.

(21) Appl. No.: 13/956,101

(22) Filed: Jul. 31, 2013

Related U.S. Application Data

(60) Provisional application No. 61/677,811, filed on Jul. 31, 2012.

(51) Int. Cl.
| | | |
|---|---|---|
| *E05B 13/10* | (2006.01) | |
| *B60Q 1/26* | (2006.01) | |
| *E05B 17/10* | (2006.01) | |
| *B60Q 1/24* | (2006.01) | |
| *F21L 4/08* | (2006.01) | |

(52) U.S. Cl.
CPC . *E05B 17/10* (2013.01); *B60Q 1/24* (2013.01); *F21L 4/08* (2013.01)

(58) Field of Classification Search
CPC . E05B 83/44; E05B 2047/0064; E05B 83/26; E05B 85/14; B60Q 1/2669; B60Q 3/0233; B60Q 3/06
USPC .................................................. 362/501, 464
See application file for complete search history.

(56) References Cited

U.S. PATENT DOCUMENTS

| | | | | |
|---|---|---|---|---|
| 2005/0219854 | A1* | 10/2005 | Grady | 362/490 |
| 2007/0258258 | A1* | 11/2007 | Wang | 362/501 |
| 2012/0212381 | A1* | 8/2012 | Yagyu et al. | 343/721 |
| 2012/0274457 | A1* | 11/2012 | Burns et al. | 340/425.5 |

* cited by examiner

Primary Examiner — Nimeshkumar Patel
Assistant Examiner — Jacob R Stern
(74) Attorney, Agent, or Firm — Botkin & Hall, LLP

(57) ABSTRACT

A latch is provided which includes a housing having a face plate and an internal chamber; a handle is rotatably connected to the housing and includes a solar panel disposed on said front face of the handle. A battery is in electrical communication with the solar panel. A keyhole light encircles a keyhole. A handle light is proximate the handle and provides light thereto. A rear light illuminates an area opposite the front face of the housing. The latch includes a sensor consisting of one or more of the following: a light sensor, a movement sensor, a sound sensor The sensor in electrical communication with one or more of said keyhole light or said handle light or said rear light.

10 Claims, 6 Drawing Sheets

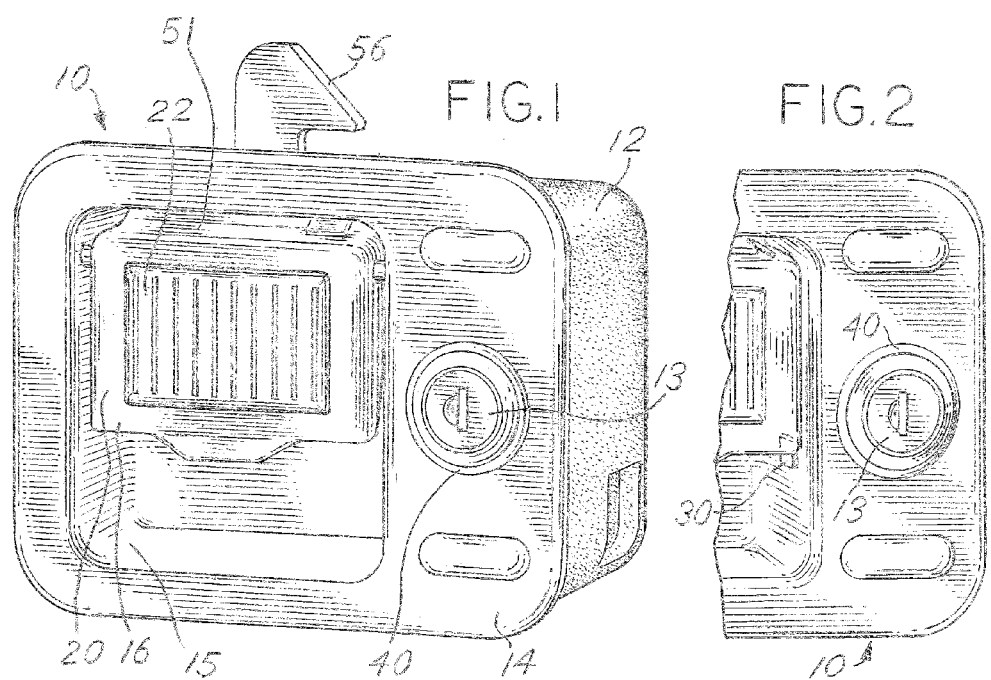
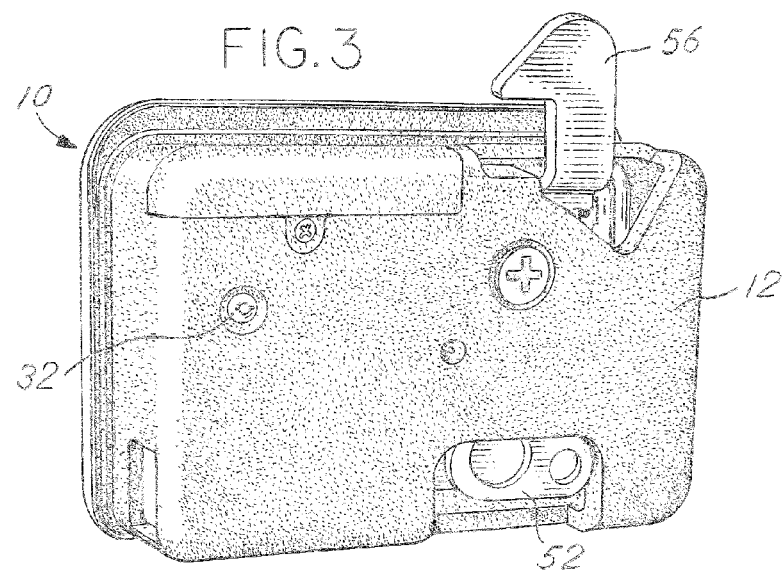

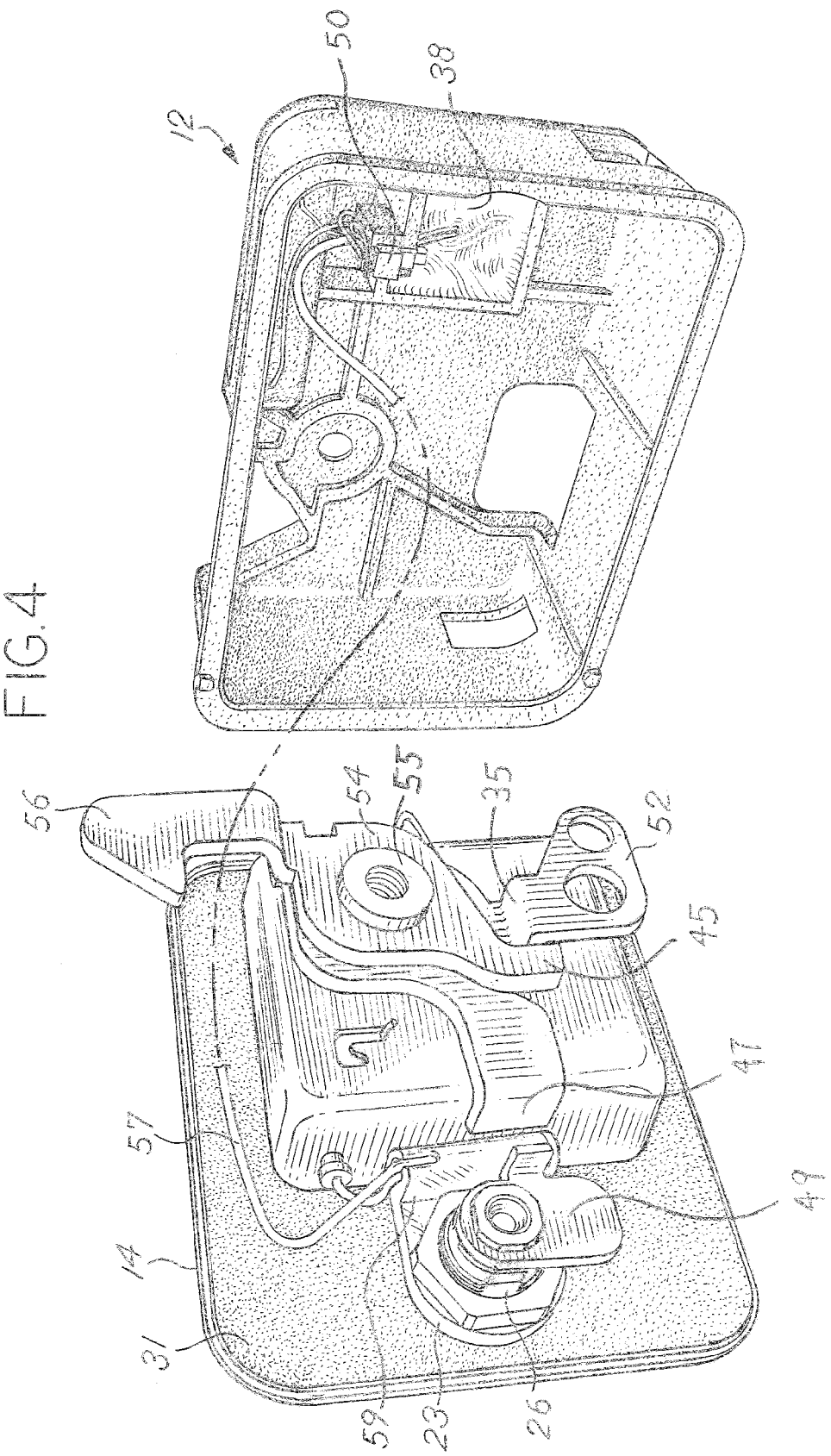

LATCH

CROSS-REFERENCE TO RELATED APPLICATIONS

The following application claims benefit of U.S. Provisional Application No. 61/677,811 filed Jul. 31, 2012, which is hereby incorporated by reference in its entirety.

BACKGROUND OF THE INVENTION

The present disclosure describes a latch, or handle, for opening an object. In one application, the latch of the present invention is used to open the door of a recreational vehicle (RV), or similar towable travel trailer. The latches used on most RVs have two functions: first to allow the door to be opened, and second to lock the door. One failing of prior art latches is that they can be difficult to locate in the dark. The present disclosure describes a latch which overcomes this problem, and provides many other improvements over prior art latches.

SUMMARY OF THE INVENTION

The present disclosure describes a latch system for a door. Specifically, the present disclosure describes a solar-powered latch system having lighting elements. The latch system includes a solar panel, a battery and a series of lights, such that the latch is illuminated by the lights when a user opens the latch or uses the lock. In this way, the latch system provides the user with a visual indication of where the latch is when the latch is in a dark, or poorly lit, area. Further, since a solar cell and battery are incorporated into the latch system, there is no need to wire the latch to an electrical system, simplifying installation and use of the latch. Additionally, the present latch system includes sensors which trigger the illumination of the light system, such sensors may include light sensors, sound sensors and/or movement/vibration sensors.

BRIEF DESCRIPTION OF THE DRAWINGS

A preferred embodiment of this invention has been chosen wherein:

FIG. 1 is a perspective front view of the latch system;

FIG. 2 is a cutaway perspective front view of the latch system of FIG. 1 and showing the handle light;

FIG. 3 is a perspective rear view of the latch system of FIG. 1;

FIG. 4 is a perspective view of the latch system of FIG. 1 showing the rear of the faceplate, the internal chamber and the inner mechanicals of the latch system;

DESCRIPTION OF THE PREFERRED EMBODIMENT

Figure 5:
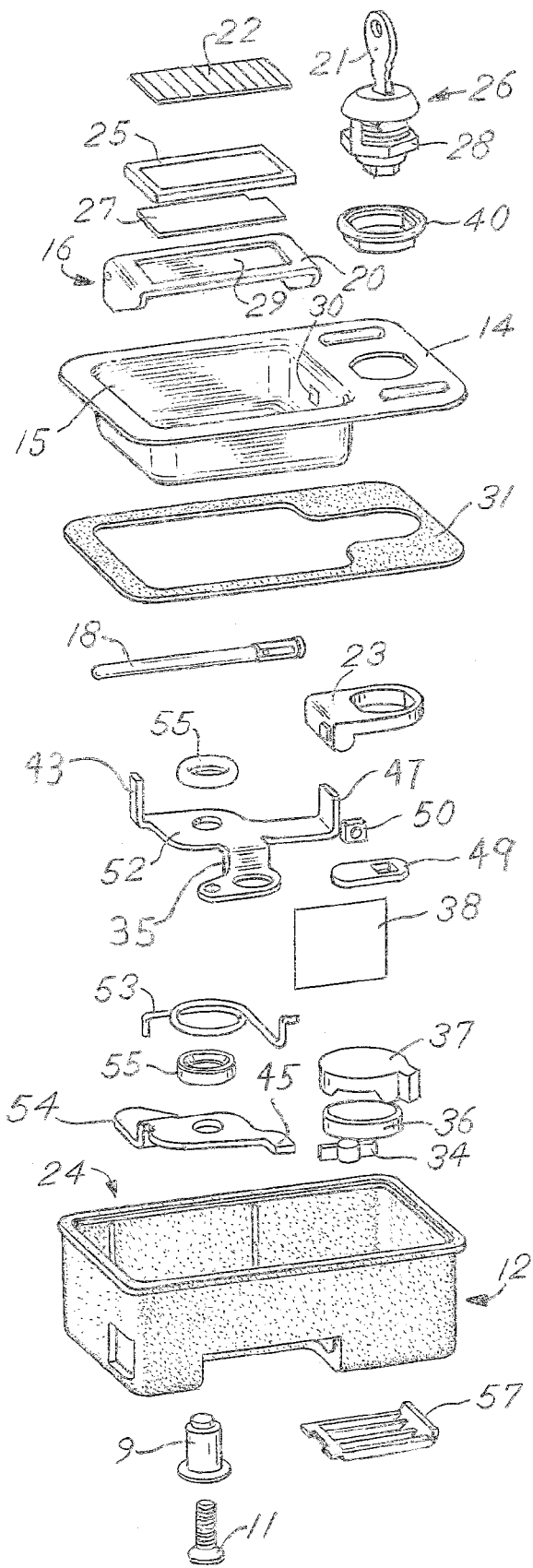
FIG. 5 is an exploded view of the components of the latch system of FIG. 1.

The present disclosure describes a solar powered latch system 10, as shown in FIGS. 1-5. The latch system 10 is formed having a housing 12 and a face plate 14, which mate together to define an internal chamber 24. The latch system 10 is adapted for opening/closing and locking/unlocking an object, such as the door of an RV (not shown). As such, it is contemplated that the housing 12 will be recessed within a chamber formed in the door of the RV, and the face plate 14 will be attached to the front of the housing and will face outwardly from the RV door. As such, the face plate 14 forms the front surface of a portion of the RV door. Any reference herein to an RV is merely illustrative of one application of the latch system of the present disclosure. It is understood that the latch system 10 has other applications beyond RVs, but for simplicity of description the present disclosure refers to the latch system as used with an RV, but this should not be read as limiting the application thereof. For example, it is contemplated that the latch system 10 is suitable to latch and lock vehicular tool boxes, vehicular compartments and any other compartment, door or other enclosure (whether part of a vehicle or otherwise) which requires latching and/or lighting.

The face plate 14 forms the front face of the latch system 10. The face plate 14 includes a depression 15 adjacent to which a handle 16 is mounted. The handle 16 is connected to the face plate 14 by a shaft 18 such that the handle 16 is rotatable relative the face plate 14. The handle partially overlies the depression 15. The depression 15 on the face plate 14 allows room for a user to reach behind the handle 16 and rotate it upwardly and away from the face plate 14, in this manner actuating the handle to release a latch 56. The handle 16 includes a front face 20 facing outwardly from the latch system 10. A solar panel 22 is mounted to the front face 20 of the handle 16. The solar panel 22 is one part of an electrical system 17 of the latch system 10. The solar panel 22 is seated in a frame 25, which frame is joined to the front face 20 by an adhesive 27. The front face 20 optionally includes a depression 29 which is sized to allow the solar panel 22 and the frame 25 to recess into the handle 16. A gasket 31 is optionally positioned between the face plate 14 and the housing 12 to form a tight fit. The face plate 14 is joined to the housing 12 by a bolt 11 at a nut 9, which nut 9 forms the center of the cams 52, 54 which are described below, which nut 9 is the axis about which the cams 52, 54 rotate. The handle 16 includes a ledge 51 that extends into the depression 15 as is shown in FIG. 1. Moving the handle 16 causes the ledge to rotate cams 52, 54.

Figure 9:
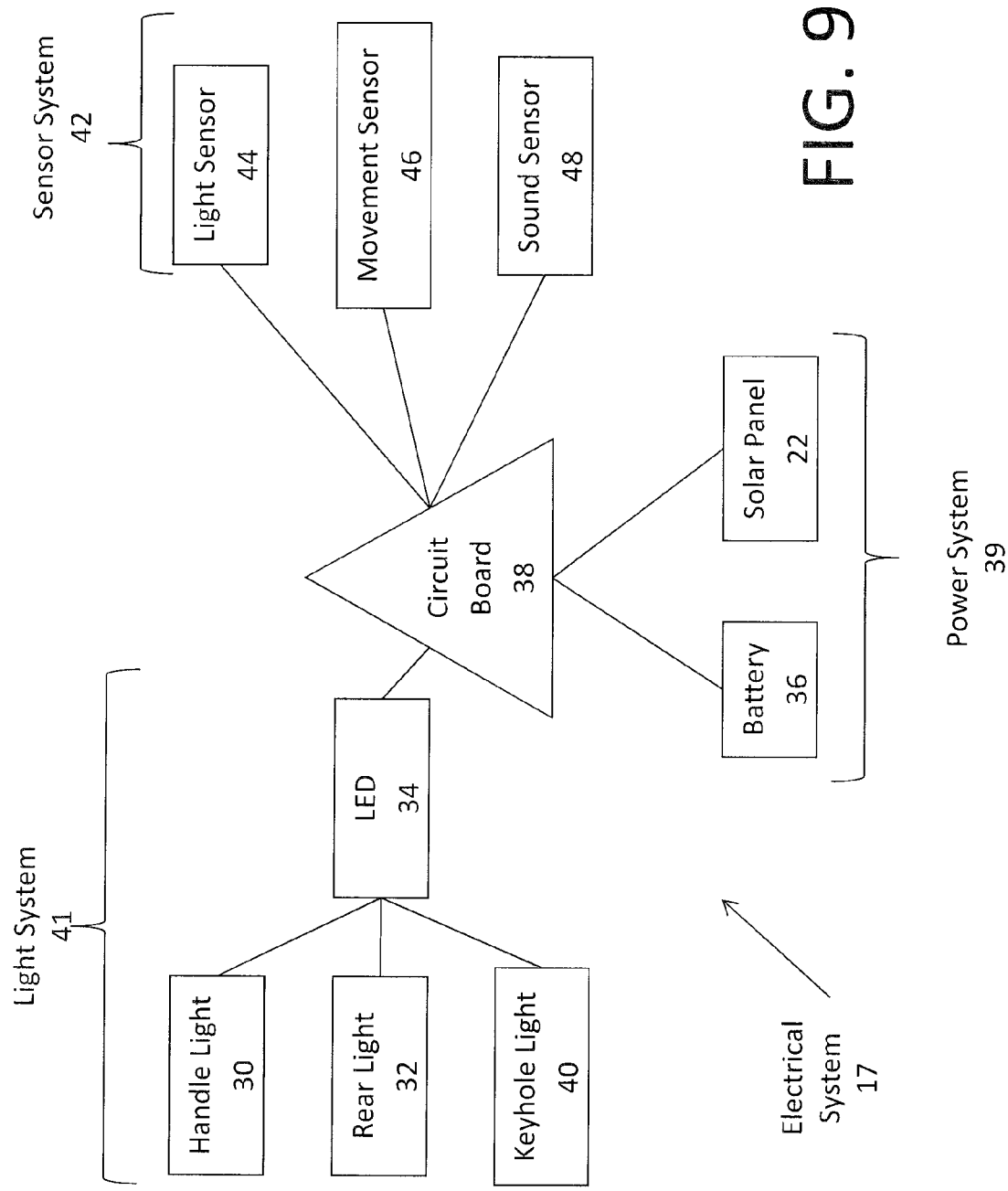
FIG. 9 is a block diagram of the circuit board, sensors, lights and power sources for the latch system.

The latch system 10 includes an electrical system 17 composed of a circuit board 38, a power system 39, a light system 41 and a sensor system 24, as illustrated in FIG. 9. The power system 39, the light system 41 and the sensor system 42 are each in electrical communication with the circuit board 38. The circuit board 38 integrates the components of the electrical system 17, which components are joined to the circuit board 38 by wiring 57.

The power system 39 includes the solar panel 22 and the battery 36 and both provide electricity to the latch system 10. In one instance, the battery 36 is a rechargeable battery which is chargeable by electricity produced by the solar panel 22. The latch system 10 is alternatively powered by the solar panel 22 (when a light source is present) or by the battery 36 (when a light source is absent) or by a combination thereof. The battery 36 is preferably carried within a housing 37. A battery cover 57 is removably joined to the housing 12 to allow access to the battery for replacement.

The light system 41 includes one or more LED 34 which is a light-emitting diode, or other suitable luminaire. The light system 41 also includes the keyhole light 40, the handle light 30 and the rear light 32, each of which receives light from the one or more LED 34. Preferably, a first LED 34 serves as a light source for both the keyhole light 40 and the handle light 30 and a second LED 34 serves as a light source for the rear light 32.

The handle light 30 is located in one of the walls which defines the depression 15 of face plate 14. The handle light 30 is defined as an opening between the internal chamber 24 and the depression 14 through which light from the LED 34 is emitted. The handle light 30 is positioned rearwardly from the handle 16. Light is emitted from the handle light 30 to illuminate the depression 15 and handle 16 to allow a user to see the handle in the dark. The light emitted from the handle light 30 emanates from the LED 34, which is carried within the internal chamber 24. In one instance, the LED 34 is positioned in or near the opening in the depression 15 and emits light into the depression 15 directly. In another instance, the LED 34 illuminates light carrier 23 which is defined as a translucent medium which carries the light illuminated from the LED 34 to the handle light 30 where the light is emitted to the depression 15. The translucent medium is any light carrying medium known in the art, such as plastic, glass or other suitable optical fiber or medium.

An aperture 19 is formed through the face plate 14 with the lock 26 is mounted in the aperture. The lock 26 includes a keyhole opening 13 for accepting a key 21. The keyhole light 40 encircles the lock 26, providing illumination in the area surrounding the keyhole, to allow the user to locate and insert the key 21 in the keyhole 13. It is contemplated that the keyhole light 40 is either a circle-shaped luminaire, or is a translucent medium which allows light to pass from LED 34 to the keyhole light 40. In one embodiment, the keyhole light is a round portion of the carrier 23 having an aperture for accepting the lock 26. In another embodiment, the keyhole light 40 is formed as a ring-shaped portion which nests within an aperture formed in the face plate 14 and which contacts the carrier 23, whereby the light from the carrier is transferred to the keyhole light 40, with both formed from a translucent medium. The lock 26 includes a lock body 28 housed within the internal chamber 24. The lock 26 includes a lock tab 49 as shown in FIG. 4. In one embodiment the carrier 23 includes a cylindrical portion 59 with a hollow center, which hollow center houses the LED 34 which illuminates the carrier 23 and accepts the wiring 57. The lock body 28 is adapted for being actuated by the key 21 to lock and unlock the latch system 10.

The rear light 32 is located at the rear of the housing 12, opposite the face plate 14. The rear light 32 emits light from the LED 34 and serves to illuminate an area behind the latch system 10. In one instance, the LED 34 is positioned at or near the location of the rear light 32 and such LED emits light to the rear light 32 directly. In another instance, a translucent medium carries light from the LED 34 to the rear light 32. In one instance, the translucent medium is a portion of the carrier 23 (not shown).

The sensor system 42 is integrated with the electrical system 17, and serves to produce signals which are transmitted within the electrical system 17. The sensor system 42 includes several sub-sensors, including: a light sensor 44, a movement sensor 46 and a sound sensor 48. The light sensor 44 functions in one or both of two ways. First, the light sensor 44 detects when the latch system 10 is illuminated by an external light, and in the absence of such external light, the light sensor 44 relays a signal to the circuit board 38 which in turn relays a signal which illuminates the LED 34, as such, the LED 34 is illuminated when latch system 10 is in the dark. Second, the light sensor 44 detects a change in illumination, such as when a person walks up to the latch system 10 and partially or complete obstructs the light on the latch system 10, which change in illumination causes the light sensor 44 to relay a signal to the electrical system 17 which in turn illuminates the LED 34. In one instance, the solar panel 22 serves as the light sensor 44. The movement sensor 46 detects when the latch system 10 is moved, such as when the handle 16 is actuated or when a key is inserted in the lock. It is contemplated that the movement sensor 46 incorporates a switch 50 which is toggled upon movement of the handle 16 or when the key is inserted. When the movement sensor 46 identifies movement, a signal is sent to the circuit board 38 which in turn relays a signal to the LED 34 causing the LED to become illuminated. An absence of movement causes a signal to be sent to deactivate the LED 34. The sound sensor 48 detects sound, and when a sound is detected proximate the latch system 10, the sound sensor 48 sends a signal the circuit board 38 which in turn send a signal to the LED 34 to illuminate the LED. The sound sensor 48 is preferably integrated on the circuit board 38. Similarly, in the absence of sound, the sound sensor 48 sends a signal to the circuit board 38 which in turn sends a signal to the LED 34 to deactivate the LED. Each of the sensors 44, 46, 48 form constituent parts of the sensor system 42 and are together in electrical communication with the circuit board 38. The circuit board 38 is programmed to activate and deactivate the LED 34 according to a pre-programmed rule set which responds to signals received from the combination of the sensors 42. The circuit board 38 is programmed with inputs from the light sensor 44, the movement sensor 46 and the sound sensor 48 and is adapted for only illuminating the LED 34 when needed, one benefit of which is to prolong battery life.

The latch system 10 includes a pair of cams 52, 54 which, when the handle 16 is actuated, serve to actuate the latch 56, which in turn allows the door, or other object in which the latch system 10 is incorporated, to open. The first cam 52 is rotatable between an open position and a closed position. The cam 54 is moved by the ledge 51 when the handle 16 is actuated. The open position is defined by the handle 16 actuated away from the face plate, the closed position is defined by the handle 16 in the rest, or closed position. The first cam 52 includes the switch 50, such that when the first cam 52 rotates about its axis to the open position as the handle 16 is lifted, the switch 50 contacts a catch thereby toggling the switch and sending a signal to circuit board 38 to activate LED 34. Switch 50 is a part of the movement sensor 46. A spring 53 resists rotation of the cams 52, 54. The cams 52, 54 are joined together by a rivet 55, or other suitable fastener. The cams rotate about the nut 9. The cam 52 has a second tab 47 that can contact the lock tab 49 when the lock 26 is moved to the locked position. When the lock tab is in the locked position, the cam 52 cannot move enough to actuate the latch 56. When cam 52 is rotated, a catch ledge 35 moves a catch tab 45 on the cam 54.

It is contemplated that, in one embodiment, the latch system 10 incorporates multiple LEDs 34, such that the LEDs are separately activated by signals from the circuit board 38 in response to signals from the various sensors 44, 46, 48. As such, in one embodiment the handle light 30, the rear light 32 and the keyhole light 40 are separately illuminated by respective LEDs 34 according to signals sent from sensors 44, 46 and/or 48 to the circuit board 38. In another embodiment, the handle light 30, rear light 32 and keyhole light 40 are illuminated by a single LED 34, which LED 34 emits light through the carrier 23 to the respective lights 30, 32, 40. In the embodiment shown in the drawings, the handle light 30 and the keyhole light 40 are illuminated by a first LED 34 and the rear light 32 is illuminated by a second LED 34. Further, a sensor is included within the lock body 28 such that when the key 21 is inserted within the keyhole 13, the sensor sends a signal to the circuit board 38, which circuit board sends a signal which illuminates the LED 34. The circuit board 38 sends and receives electrical communication between the various sensors 44, 46, 48, lights 30, 32, 40 and power systems 22, The present invention is a latch/light combination which is suitable for both opening and closing an object and for providing illumination to allow a user to locate the latch. The latch assembly 10, as described herein, is adaptable for use as a handle for a door, compartment, panel or similar object which opens and closes. The circuit board 38 of the latch assembly 10 is programmed to only illuminate the LED 34 at times when a user is likely to want to use latch 10.

Figure 6:
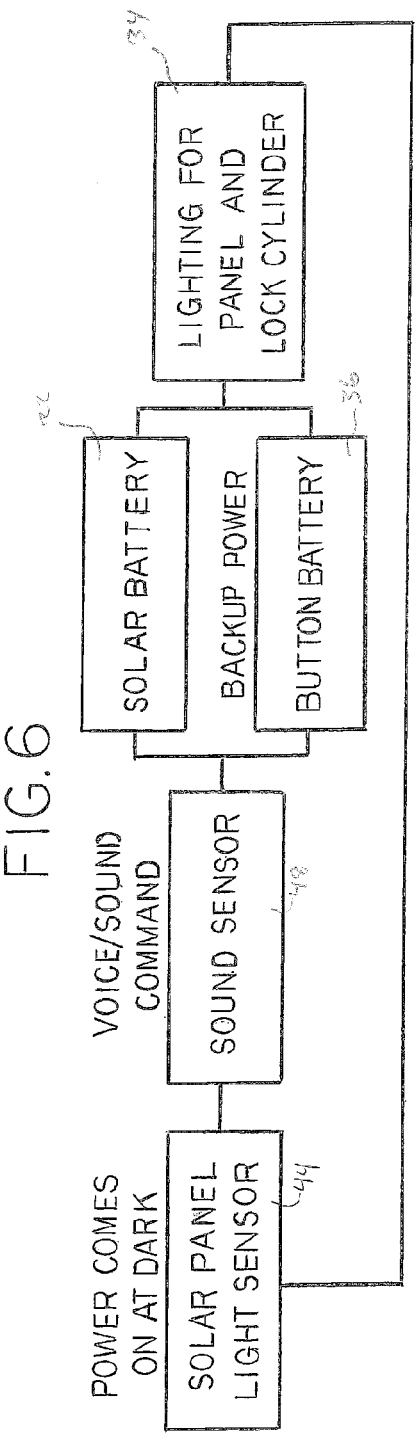
FIG. 6 is a flow diagram showing the various sensors, lights and power sources of the latch system.
Figure 7:
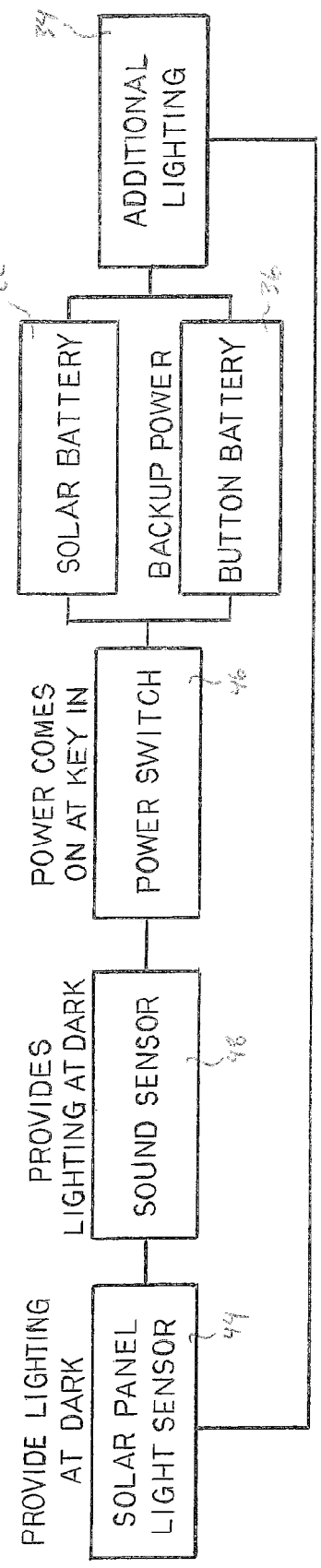
FIG. 7 is a flow diagram of the latch system which also includes a power switch.

FIGS. 6 and 7 provide flow diagrams which illustrate the various elements of the electrical system of the latch system 10. As shown in the flow charts, the light sensor 44 provides a signal which turns the LED 34 on at dark. The sound sensor 48 provides a signal which turns the LED 34 on when it detects sound. The solar panel 22 and battery 36 power the system. The LED 34 provides lighting to the panel and to the lock cylinder. As shown in FIG. 7, additional lighting, such as the rear light 32, is optionally provided.

Figure 8:
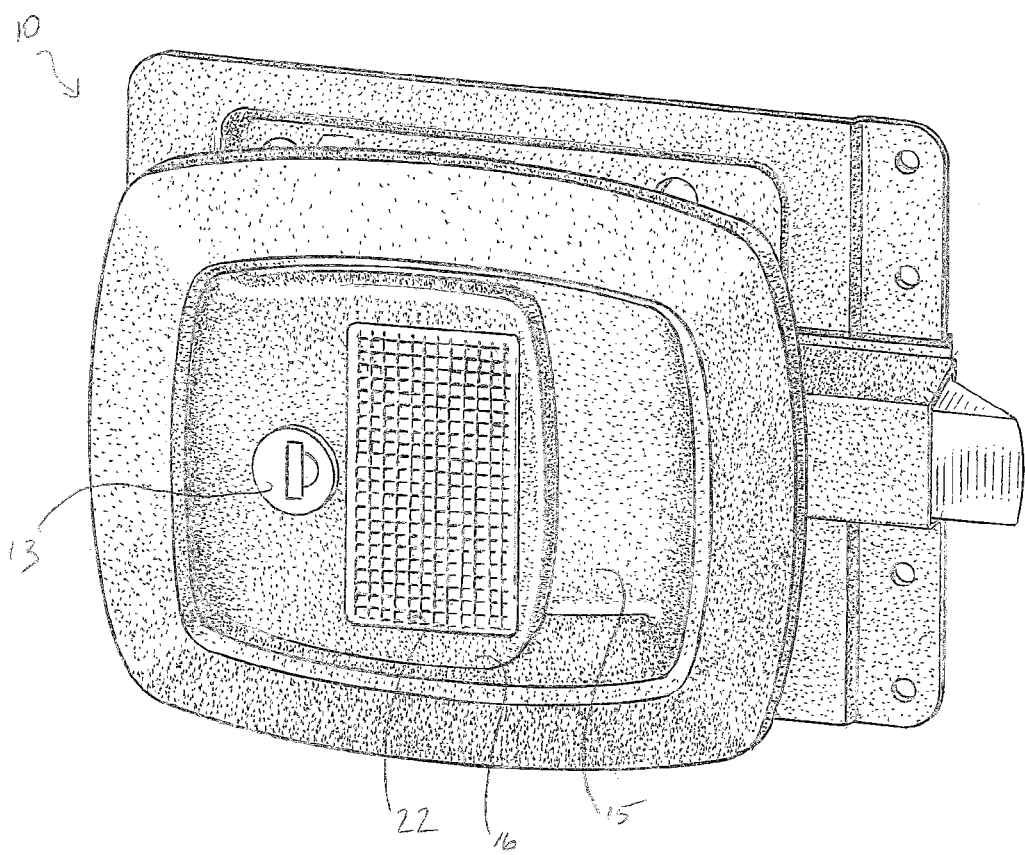
FIG. 8 is a perspective front view of an alternative outer housing for the latch system.

FIG. 8 shows an alternative embodiment of the latch system 10 showing a different casing and design. The latch system of FIG. 8 includes the same constituent elements of the latch system of FIGS. 1-5, but in a different aesthetic design. The latch system 10 shown in FIG. 8 includes the same electrical system included in the latch system of FIGS. 1-5 and has the same benefits.

As illustrated in the block diagram of FIG. 9, the electrical system 17 is formed from four constituent parts: the circuit board 38, the light system 41, the sensor system 42 and the power system 39. The circuit board 38 serves as the control center for the electrical system 17 and integrates the three sub-systems: the light system 41, the sensor system 42 and the power system 39. The power system 39 serves the purpose to provide power to the electrical system 17, including, but not limited to, providing power to illuminate the one or more LED 34. The light system 41 includes one or more LED 34 (illustrated as a single LED in the block diagram of FIG. 9, but could include multiple luminaries), which one or more LED 34 serves as a light source for the handle light 30, the rear light 32 and the keyhole light 30. The one or more LED 34 is illuminated when it receives a signal from the circuit board 38, such a signal is typically a circuit being opened or closed on the circuit board. The sensor system 42 provides a number of sub-systems, including the light sensor 44, the movement sensor 46 and the sound sensor 48, which provide signals to the circuit board 38. The circuit board processes the signals received from the sensor system 42 and activates or inactivates the LED 34 accordingly, as described in greater detail herein. As previously mentioned, in one embodiment, the light sensor 44 is the solar panel 22.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An illuminated locking latch for selectively securing a door, said latch comprising:
    a housing having a front face, said front face having a depression;
    a handle pivotally held within said depression, said handle pivoting about a pin spanning said depression, said handle including an outer surface and a ledge extending from said handle toward said depression, said handle movable between a first position and a second position, said first position having said outer surface of said handle being substantially aligned with said front face and said second position having said outer surface of said handle being rotated outwardly of said front face;
    a first cam pivotally affixed to a surface opposite said front face on said depression and rotatable about a cam axis, said first cam having a first tab extending through said depression and adapted for contacting said ledge of said handle, a second tab and a catch ledge, movement of said handle from said first position toward said second position causing rotation of said first cam about said axis;
    a second cam pivotally affixed to said surface opposite said front face on said depression and rotatable about said cam axis, said second cam including a catch tab adapted for contacting said catch ledge of said first cam and said second cam including a latch portion, said second cam having a locked position and an open position, rotation of said handle from said first position toward said second position causing said catch ledge of said first cam to rotate said second cam from a locked position corresponding to when said handle is in said first position toward an unlocked position when said handle is in said second position;
    a spring rotationally biasing said second cam toward said locked position and biasing said catch tab of said second cam into contact with said first cam;
    a lock affixed to said front face and including a rotatable cylinder extending through said front face, said cylinder including a tab being rotatable with said cylinder, said cylinder and said tab rotatable between an open position and a locked position that corresponds to said tab impinging on said first cam to selectively lock movement of said handle;
    a switch located in proximity to said tab of said cylinder, rotation of said tab to said locked position causing a portion of said tab to toggle said switch;
    a solar cell located externally of said housing and adapted for generation of electricity;
    a battery electrically connected to said solar cell for storage of said electricity generated by said solar cell; and
    a luminaire electrically connected to said battery through said switch, said luminaire for providing light.

2. The illuminated locking latch of claim 1, said pin having a central bore having wiring, said wiring connecting said solar cell to said battery.

3. The illuminated locking latch of claim 2, a portion of said tab including an upstanding portion for contacting said switch.

4. The illuminated locking latch of claim 3, said handle including a biasing spring biasing said handle to said first position.

5. The illuminated locking latch of claim 1, and a light sensor located externally of said housing.

6. The illuminated locking latch of claim 5, said light sensor being said solar panel.

7. The illuminated locking latch of claim 1, when said tab is in said unlocked position and said light sensor is detecting a low-light condition, said luminaire being illuminated from said battery.

8. The illuminated locking latch of claim 7, said luminaire being affixed to said housing, said luminaire illuminating a portion of said lock and said handle when said luminaire is producing illumination.

9. The illuminated locking latch of claim 8, said latch including a rear light illuminating an area opposite said front face.

10. The illuminated locking latch of claim 9, said circuit board capable of illuminating said luminaire separately from said rear light.

\* \* \* \* \*